Sept. 27, 1955 A. VAN DER ZIEL ET AL 2,719,223
CIRCUIT FOR MIXING A CARRIER WAVE WITH AN AUXILIARY WAVE
Filed May 3, 1947
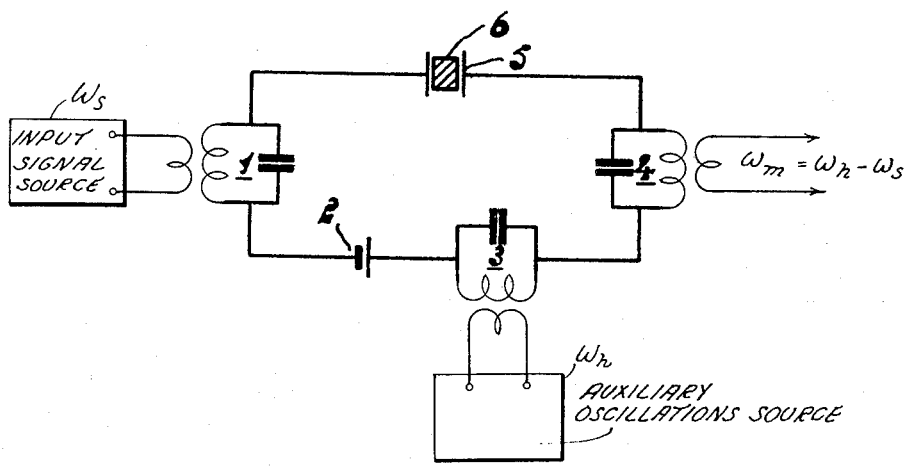
A. VAN DER ZIEL & K.S. KNOL
INVENTORS
BY Fred M. Vogel
AGENT

United States Patent Office 2,719,223
Patented Sept. 27, 1955

2,719,223

CIRCUIT FOR MIXING A CARRIER WAVE WITH AN AUXILIARY WAVE

Aldert van der Ziel and Kornelis Swier Knol, Eindhoven, Netherlands, assignors to Hartford National Bank and Trust Company, Hartford, Conn., as trustee Application May 3, 1947, Serial No. 745,770

Claims priority, application Netherlands May 28, 1946

11 Claims. (Cl. 250—20)

This invention relates to a circuit adapted for mixing, at short waves ($\lambda<10$ metres), a carrier-wave modulated with a signal and an auxiliary oscillation.

According to the invention, the modulated carrier-wave is supplied, together with the auxiliary oscillation, to an electric circuit which includes a condenser having a dielectric the properties of which are dependent on the voltage set up across the condenser and/or on the current flowing through the condenser. The frequency of the auxiliary oscillation is given a value such as to produce a beat voltage modulated with the signal, from which an amplified signal may be derived and the frequency of which is higher than and preferably high with respect to that of the initial carrier-wave.

The invention is based on recognition of the fact that the aforementioned circuit permits of producing a signal which is amplified with respect to the initial signal, provided that the frequency of the newly produced carrier-wave, from which the signal may be derived, is higher than and preferably high with respect to that of the initial carrier-wave. The amplification of the signal need not necessarily be manifest in the form of voltage amplification, it may be obtained as well in the form of current amplification or energy amplification.

The invention will be explained more fully by reference to the accompanying drawing showing, by way of example, one mixing circuit according thereto.

The figure shows an oscillatory circuit 1 which is tuned to a high-frequency carrier wave, a source 2 of direct current, an oscillatory circuit 3 which is tuned to the auxiliary oscillation, an oscillatory circuit 4 which is tuned to a beat voltage to be produced, and a condenser 5 having a dielectric 6, the properties of which are dependent on the voltage set up across the condenser and/or on the current flowing through the condenser. The high-frequency carrier-wave modulated with the signal is supplied to the oscillatory circuit 1. In the oscillatory circuit 3 a voltage is induced which is active in the circuit as an auxiliary oscillation, and the newly produced beat voltage may be derived from the oscillatory circuit 4.

The dielectric 6 may consist, for example, of Seignette salt or a substance which mainly consists of a representative of the ternary system BaTiO3—SrTiO3—PbTiO3. If the latter substance is used as the dielectric, it is not necessary for the three components of the ternary system to be present at the same time.

Very satisfactory results are obtained with a dielectric which substantially consists of BaTiO3, or of representatives of the binary system BaTiO3—SrTiO3, for example BaTiO3 and 35 mol. percent at the most of SrTiO3.

When the circuit is used at room temperature it is preferable for the percentage of SrTiO3 to be comprised between 15 and 30.

The various binary and ternary mixed products constitute homogeneous mixed crystals which, as the constitutive raw materials, exhibit a Perowskite structure.

Under certain conditions blocking-layer rectifiers may alternatively be used as condensers having a voltage-dependent dielectric.

It is not necessary that all the properties of the dielectric are dependent on voltage and/or current. As a rule, the dielectric constant, frequently the loss angle, and in certain cases both of them exhibit this dependency.

The operation of the circuit is as follows: Owing to the non-linear properties of the condenser 5 there is produced *inter alia* a beat voltage modulated with the signal, the beat voltage having an angular frequency ($\omega_m$) which equals the difference between the angular frequency of the auxiliary oscillation ($\omega_h$) and the angular frequency of the initial carrier wave ($\omega_s$).

If in the circuit as described $\omega_h$ is given a value such that $\omega_m$ is higher than $\omega_s$, the signal is modulated on the beat voltage ($\omega_m$ in amplified form, so that an amplified signal may be derived from the beat voltage by demodulation.

As an alternative, the circuit may, for example, be such that the oscillatory circuit 4 is tuned to a frequency which equals the sum of the frequencies of the initial carrier wave $\omega_s$ and of the auxiliary oscillation $\omega_h$. In this case the aforementioned condition: $\omega_m>\omega_s$ is automatically fulfilled.

In this connection it may be mentioned that the above-mentioned circuit does not permit amplification of the signal to be obtained if the frequency $\omega_m$ is lower than the frequency of the initial carrier-wave $\omega_s$.

It is not necessary that the various oscillatory circuits and the condenser are all included in series in the electric circuit. It is alternatively possible to connect a number of these elements in parallel provided that undesirable short-circuits with respect to oscillations active in the circuit are avoided.

As a rule, it is desirable to give the condenser a biassing potential, as is also shown. In some cases, however, a biassing potential need not be applied.

In one embodiment of the invention were measured:

|  | $f_s$ (signal frequency) m. cycles/sec. | $f_h$ (auxiliary oscillation frequency) m. cycles/sec. | $f_m$ (beat frequency) m. cycles/sec. | $S_c$ conversion slope, micro-amps/v. |
|---|---|---|---|---|
| (a) | 15 | 60 | 45 | 160 |
| (b) | 45 | 60 | 15 | 65 | where $$f_s=\frac{\omega_s}{2\pi}, \quad f_h=\frac{\omega_a}{2\pi}, \quad f_m=\frac{\omega_m}{2\pi}, \quad Sc=\text{conversion slope}$$

and the dielectric is of the composition 80 mol. percent of BaTiO3 and 20 mol. percent of SrTiO3.

It may be proved that the ratio $$\frac{Sc_a}{Sc_b}$$

is a measure of the energy amplification that can be obtained with the circuit.

In the above-mentioned measurement this ratio is almost 2.5, which implies that the circuit supplies an amplified beat or intermediate-frequency signal with the frequency transformation to a higher intermediate frequency.

The circuit according to the invention itself produces no noise or substantially no noise. Since the incoming oscillations are amplified by the circuit, the noise of the amplifier following the circuit has much less influence on the reception of the signal than it would be the case without such amplification.

In one practical example the incoming oscillations may exhibit a frequency of 300 megacycles/sec. In the circuits of known type these oscillations are mixed directly with the use of a diode or crystal detector, with local oscillations of a frequency such that, for example, an intermediate frequency of 15 megacycles/sec. ensues.

According to the invention, however, transformation takes place at first to a higher frequency, for example to 1500 megacycles/sec., with the use of a condenser having a dielectric dependent on voltage and/or current, and subsequently from 1500 to 15 megacycles/sec., for example by means of a crystal detector.

The capacity of condenser 5 is preferably given a low value, which is comprised, for example, between 1 and 100 pF's. At comparatively small wavelength use is generally made of smaller capacities. In the measurement as described a condenser of about 20 pF's was used.

For a more detailed explanation of the theory underlying the present invention, reference is made to the article "On The Mixing Properties Of Non-Linear Condensers" by A. van der Ziel published in November 1948 in the Journal of Applied Physics, vol. 19, No. 11, pages 999–1006.

What we claim is:

1. In a system for mixing a modulated carrier wave with locally generated oscillations, the combination comprising a non-linear condenser provided with a dielectric member of titanate material and having a characteristic which depends on the voltage established across said condenser, a circuit coupled to said condenser for conducting said carrier wave in combination with said local oscillations through said condenser, and means for deriving from said circuit a beat voltage of the combined carrier wave and local oscillations whose frequency exceeds that of said carrier wave.

2. In a system, as set forth in claim 1, wherein said dielectric is constituted by barium titanate.

3. In a system, as set forth in claim 1, wherein said dielectric is constituted by a representative of the ternary system barium titanate-strontium titanate-lead titanate.

4. In a system, as set forth in claim 1, wherein said dielectric is constituted by a representative of the binary system barium titanate-strontium titanate.

5. A signal modulating network including a source of input signals, a second source of signals, a non-linear substantially purely reactive capacitive device of which the reactance varies as a non-linear function of the magnitudes of voltages applied thereto, said device comprising a capacitor having a titanate dielectric, means for applying signal voltages from both of said sources to said device, and means for deriving from said device signals characteristic of a modulation component of said applied signals.

6. In a network, as set forth in claim 5, wherein said dielectric is constituted by a representative of the binary system barium titanate-strontium titanate.

7. A signal modulating network including a source of input signals, a second source of signals, a non-linear substantially purely reactive capacitive device of which the reactance varies as a non-linear function of the magnitudes of voltages applied thereto, said device comprising a capacitor having a titanate dielectric, means for applying signal voltages from both of said sources to said device, means for applying a biasing potential to said device, and means for deriving from said device signals characteristic of a modulation component of said applied signals.

8. A network according to claim 6, wherein the titanate dielectric of said device has proportions of the order of 70 to 85 mol. percent barium titanate and 15 to 30 mol. percent of strontium titanate.

9. A network according to claim 5, wherein the dielectric of said device substantially consists of barium titanate.

10. A network according to claim 5, wherein the dielectric of said device is constituted by a representative of the ternary system barium titanate-strontium titanate-lead titanate.

11. A signal modulating network including a source of input signals having an angular frequency $\omega_m$, a second source of signals having an angular frequency $\omega_h$, a non-linear substantially purely reactive capacitive device of which the reactance varies as a non-linear function of the magnitudes of voltages applied thereto, said device comprising a capacitor having a titanate dielectric, means for applying signal voltages from both of said sources to said device, and means for deriving from said device signals characteristic of a modulation component $$(\omega_m \pm \omega_h)$$

of said applied signals.

References Cited in the file of this patent

UNITED STATES PATENTS

| Number | Name | Date |
|---|---|---|
| 1,712,993 | Heising | May 14, 1929 |
| 1,794,365 | Chireix | Mar. 3, 1931 |
| 2,239,560 | Herold | Apr. 22, 1941 |
| 2,243,921 | Rust et al. | June 3, 1941 |
| 2,253,853 | Haantjes et al. | Aug. 26, 1941 |
| 2,273,640 | Haantjes et al. | Feb. 17, 1942 |
| 2,387,472 | Sontheimer | Oct. 23, 1945 |
| 2,399,082 | Wainer | Apr. 23, 1946 |
| 2,430,835 | Strutt et al. | Nov. 11, 1947 |
| 2,443,094 | Carlson | June 8, 1948 |
| 2,461,307 | Antalek | Feb. 8, 1949 |

FOREIGN PATENTS

| Number | Country | Date |
|---|---|---|
| 460,408 | Great Britain | Jan. 27, 1937 |